(12) United States Patent
Svantesson et al.

(10) Patent No.: US 11,650,133 B2
(45) Date of Patent: May 16, 2023

(54) TIRE STIFFNESS ESTIMATION AND ROAD FRICTION ESTIMATION

(71) Applicant: NIRA DYNAMICS AB, Linkoping (SE)

(72) Inventors: Thomas Svantesson, Linkoping (SE); Andreas Myklebust, Linkoping (SE)

(73) Assignee: NIRA DYNAMICS AB, Linkoping (SE)

( * ) Notice: Subject to any disclaimer, the term of this patent is extended or adjusted under 35 U.S.C. 154(b) by 1131 days.

(21) Appl. No.: 16/063,698

(22) PCT Filed: Dec. 16, 2016

(86) PCT No.: PCT/EP2016/002121
§ 371 (c)(1),
(2) Date: Jun. 18, 2018

(87) PCT Pub. No.: WO2017/102086
PCT Pub. Date: Jun. 22, 2017

(65) Prior Publication Data
US 2020/0271550 A1  Aug. 27, 2020

(30) Foreign Application Priority Data
Dec. 18, 2015  (DE) .......................... 102015016507.0

(51) Int. Cl.
*B60W 40/068*  (2012.01)
*G01N 19/02*  (2006.01)
(Continued)

(52) U.S. Cl.
CPC .......... *G01M 17/02* (2013.01); *B60W 40/068* (2013.01); *G01N 19/02* (2013.01);
(Continued)

(58) Field of Classification Search
CPC ................ B60W 40/068; B60T 8/1763; B60T 8/17633; B60T 8/17636; G01M 17/02
See application file for complete search history.

(56) References Cited

U.S. PATENT DOCUMENTS 6,360,150 B1 *  3/2002  Fukushima .......... B60T 8/17552
                                                         303/140
6,508,102 B1 *  1/2003  Margolis ................. B60T 8/172
                                                            73/8
(Continued)

FOREIGN PATENT DOCUMENTS

DE    102006016767 A1 * 10/2007   ............. G01N 19/02
DE    102007052751 A1 *  5/2009   .......... B60W 40/068
(Continued)

OTHER PUBLICATIONS

Gustafsson, Fredrik. "Slip-based estimation of tire-road friction." Linköping University, 1995.*
(Continued)

*Primary Examiner* — Herbert K Roberts
(74) *Attorney, Agent, or Firm* — Womble Bond Dickinson (US) LLP (57) ABSTRACT

The disclosed invention makes use of slip related values to calculate friction related values and tire stiffness related values and feeds back an estimated tire stiffness relates value or a calculated friction related as a basis for further calculations. In particular, the disclosure relates to methods, apparatuses and computer program products to achieve the mentioned objective.

6 Claims, 7 Drawing Sheets

(51) Int. Cl.
  *B60T 8/1763*  (2006.01)
  *G01M 17/02*  (2006.01)
  *B60T 8/172*  (2006.01)
  *B60W 40/12*  (2012.01)
  *B60W 50/00*  (2006.01)

(52) U.S. Cl.
  CPC .......... *B60T 8/172* (2013.01); *B60T 2210/12* (2013.01); *B60T 2210/30* (2013.01); *B60T 2240/03* (2013.01); *B60T 2250/00* (2013.01); *B60T 2250/04* (2013.01); *B60T 2270/86* (2013.01); *B60W 40/12* (2013.01); *B60W 2050/0012* (2013.01); *B60W 2510/22* (2013.01); *B60W 2520/10* (2013.01); *B60W 2520/105* (2013.01); *B60W 2520/125* (2013.01); *B60W 2530/20* (2013.01); *B60W 2552/40* (2020.02)

(56) References Cited

U.S. PATENT DOCUMENTS

| | | | | |
|---|---|---|---|---|
| 2012/0179327 | A1* | 7/2012 | Yngve | B60W 40/064 701/32.9 |
| 2015/0019103 | A1* | 1/2015 | Choi | G05D 1/027 901/1 |
| 2016/0129894 | A1* | 5/2016 | Singh | B60T 8/17613 701/74 |
| 2016/0159365 | A1* | 6/2016 | Singh | B60T 8/1725 701/32.9 |
| 2016/0368503 | A1* | 12/2016 | Jonasson | B60W 40/064 |
| 2017/0010184 | A1* | 1/2017 | Singh | B60C 19/00 |
| 2017/0113495 | A1* | 4/2017 | Singh | B60C 23/20 |
| 2017/0113499 | A1* | 4/2017 | Singh | B60C 23/0486 |
| 2018/0029603 | A1* | 2/2018 | Kasaiezadeh Mahabadi | B60W 30/02 |
| 2018/0105151 | A1* | 4/2018 | Gustafsson | B60W 40/068 |

FOREIGN PATENT DOCUMENTS

| | | | | |
|---|---|---|---|---|
| DE | 102014220747 | A1 * | 2/2016 | .......... B60W 40/101 |
| EP | 1964736 | A1 * | 9/2008 | ............. B60T 8/172 |
| EP | 1964736 | A1 | 9/2008 | |
| EP | 2927074 | A1 | 10/2015 | |
| EP | 2927066 | B1 * | 4/2017 | ............. B60T 8/171 |
| JP | 2005239071 | A * | 9/2005 | |
| JP | 2006034012 | A * | 2/2006 | |
| JP | 2007176260 | A * | 7/2007 | |
| JP | 2009184625 | A * | 8/2009 | |
| JP | 2012153290 | A * | 8/2012 | |
| JP | 2014228316 | A * | 12/2014 | |
| WO | WO 02053426 | A1 | 7/2002 | |

OTHER PUBLICATIONS

Karjalainen, Max. "Real-time estimation of tire stiffness." Linköping University. (2016).*

Baffet, Guillaume, Ali Charara, and Daniel Lechner. "Estimation of vehicle sideslip, tire force and wheel cornering stiffness." Control Engineering Practice 17.11 (2009): 1255-1264.*

European Patent Office—International Search Report of the International Searching Authority dated Mar. 1, 2017 for related International Application No. PCT/EP2016/002121 (3 pgs).

European Patent Office—Written Opinion of the International Searching Authority dated Mar. 1, 2017 for related International Application No. PCT/EP2016/002121 (5 pgs).

* cited by examiner

TIRE STIFFNESS ESTIMATION AND ROAD FRICTION ESTIMATION

CROSS-REFERENCE TO RELATED APPLICATIONS

This patent application is a U.S. National Phase application under 35 U.S.C. § 371 of International Application No. PCT/EP2016/002121, filed on 16 Dec. 2016, entitled TIRE STIFFNESS ESTIMATION AND ROAD FRICTION ESTIMATION, which claims priority to German Patent Application No. 102015016507.0 filed on 18 Dec. 2015.

TECHNICAL FIELD

The present invention disclosure generally relates to the area of estimating friction between a tire and a road surface and to the area of estimating tire properties in wheeled vehicles. In particular, it relates to methods, systems and computer program products for estimating tire stiffness or road friction.

BACKGROUND OF THE INVENTION

Road friction may vary abruptly, e.g. from icy to dry or wet stretches of road. These changes pose a significant challenge to the driver and his or her safety and comfort. From a technical point of view, reliable quantification of road friction is crucial for implementing vehicle control systems, such as Anti-lock Braking System (ABS). Knowledge of the available friction potential may for example be used to optimize the brake distance if an ABS braking needs to be conducted. Additionally or alternatively, friction may be used by one or more of a variety of systems, including autonomous driving, adaptive cruise control, slippery road detection and connected driving.

Known approaches to estimate or calculate road friction include approaches based on slip, sound, tire tread deformation, road roughness and lubricant detection. In particular, slip-based approaches often take into account estimated tire stiffness, which may serve to increase estimation accuracy.

US patent application 2015/0284006 A1 discloses a comparative analysis between a model-based stiffness and an actual stiffness and deduces a friction-related factor directly in open loop.

However, open loop approaches typically rely on tire identification, e.g. from an RFID tag, to determine stiffness. Tire characteristics may vary throughout the lifetime of the tire or even during operation in a variety of ways, caused by variation e.g. in type (winter, summer, ultra-high performance tires), storage conditions (temperature, pressure), operation conditions (temperature, pressure, wear, load) or age. Open loop approaches typically are not capable of calibrating reliably or of learning tire characteristics during operation. Furthermore, open loop approaches typically do not output a measure of uncertainty, i.e. how reliable their estimates are.

Object of the Invention

In order to overcome shortcoming of known approaches, particularly of the kind mentioned above, an object of the present invention is to provide solution for estimating at least one of road friction and tire stiffness in closed loop.

SUMMARY OF THE INVENTION

Methods, computer program products and apparatuses for determining at least one of a friction potential and a tire stiffness of a wheel of a vehicle are disclosed.

Generally, the invention makes use of slip related values. Slip related values include one or more of the following: slip, slope of the traction force vs slip curve and the inverse of said slope. In the following, any curve displaying normalized traction forces versus slip is referred to as "slip curve".

Slip related values are provided by at least one vehicle sensor comprised by the vehicle, for example wheel speed sensors, absolute speed sensors, radar, optical or infrared sensors, GPS, accelerometers, angular velocity sensors, steering wheel or individual wheel angle sensors. In particular, slip related values may be provided in form of a time series.

Slip may generally be defined as a normalized difference between a rotational speed of a wheel and a longitudinal speed of the vehicle. In front or rear wheel drive vehicles, the non-driven wheels may serve as speed reference(s). In addition, models are known to the skilled person to determine slip an all-wheel-drive vehicles. The present methods are not restricted to slip values obtained from a particular method or model.

In general, a method according to the invention comprises calculating a first friction related value, estimating a second tire stiffness related value and feeding back the second tire stiffness related value.

Calculating a first friction related value is based on a first slip related value and a first tire stiffness related value.

The estimation of a second tire stiffness related value is based on the first slip related value, the calculated first friction related value and a second friction related value. The second friction related value may include one or more of the following: a traction force or normalized traction force, an applied wheel torque, a used longitudinal or lateral acceleration, or a combination of both, a brake pressure used, a friction used during an ABS braking, a friction used when the Traction Control System (TCS) is activated or the current friction potential provided as data available over the vehicle connectivity. The term "vehicle connectivity" is understood to encompass any communication with entities external to the vehicle, such as vehicle-to-vehicle or vehicle-to-infrastructure communication. For instance, by using data provided over vehicle connectivity it would be sufficient for one vehicle to have a calibrated tire model and relays its friction related value to other vehicles of a fleet (directly or via an intermediate entity such as a server or cloud service). The other vehicles of the fleet may calibrate their tire models instantaneously based on the relayed friction related value.

Generally, the second tire stiffness related value is fed back as a basis of a calculation of a third friction related value. In the following, the term "fed back" is understood to imply that the fed-back output is intended as an input to or basis of a calculation or estimation at a later point in time, in particular during a later iteration of a loop. The calculation or estimation at a later point in time may or may not form part of the method as disclosed herein.

The second tire stiffness related value is based on the estimated first tire stiffness. In particular, it may or may not be identical to the (estimated) tire stiffness, on which it is based.

Accordingly, in some embodiments, the steps of the method according to the invention may be carried out repeatedly, i.e. iteratively in closed loop. In such cases, at each iteration, first and second values are substituted by second and third values, etc.

In some embodiments, the steps of calculating a friction related value and estimating a tire stiffness related value may be carried out in inverse order as compared to the above. In such cases the method comprises the steps of: (i) Estimating a first tire stiffness based on a first slip related value and a first friction related value, (ii) Calculating a second friction related value based on the first slip related value, the estimated first tire stiffness related value and a second stiffness related value, and (iii) feeding back the calculated second friction related value as a basis of an estimation of a third tire stiffness.

In some embodiments, a third friction related value may be calculated based on a second slip related value and the fed-back second tire stiffness related value.

In some embodiments, a third tire stiffness related value may be estimated based on a second slip related value and the fed-back second friction related value.

Preferably, a friction uncertainty measure may be computed, which is indicative of the uncertainty of at least one of the first friction related value and second friction related value or another friction related value.

Preferably, a stiffness uncertainty measure may be computed, which is indicative of the uncertainty of at least one of the first tire stiffness related value and second tire stiffness related value or another tire stiffness related value.

In some embodiments, a stiffness-correction factor may be estimated in a feedforward loop. In this case, the first tire stiffness related value may also be based on the stiffness-correction factor.

For instance, the estimating of the stiffness-correction factor may be based on at least one of the following:
  a pressure of the tire,
  a temperature of the tire,
  an ambient temperature,
  an axle height,
  a suspension pressure,
  a suspension height.

In some embodiments, the estimating may also be based on at least one of the following:
  a tire type, manually entered via a human-machine-interface
  an estimated friction potential from an ABS braking,
  an estimated friction potential from a TCS event,
  an estimated friction potential received from vehicle connectivity,
  a normalized traction force on the wheel,
  a friction related value,
  a torque applied on the wheel,
  a longitudinal acceleration,
  a lateral acceleration,
  a brake pressure,
  a yaw rate,
  a wheel speed,
  a vehicle speed,
  a steering wheel angle,
  a wheel angle,
  a tire pressure,
  a tire temperature,
  an ambient temperature,
  an axle height,
  a suspension pressure,
  a suspension height,
  a control flag register.

Examples of flags of the control flag register include indications whether ESC control is in progress, ABS Braking is in progress, TCS is in progress, braking is in progress, a gear shift is in progress, the clutch pedal is engaged, a reverse gear is engaged, a trailer is connected, or a cruise control is engaged.

Further, a computer program product is disclosed, which includes program code configured to, when executed in a computing device, carry out the steps of one of the disclosed methods.

Finally, an apparatus is disclosed, which comprises a processing unit. The processing unit is configured to perform the steps of one of the methods as disclosed herein.

In particular, the processing unit may be configured to calculate a first friction related value based on a first slip related value and a first tire stiffness related value, to estimate a second tire stiffness related value based on the first slip related value, the calculated first friction related value and the a second friction related value, and to feed back the estimated second tire stiffness related value as a basis of a calculation of a third friction related value.

Alternatively or additionally, the processing unit may be configured to estimate a first tire stiffness related value based on a first slip related value and a first friction related value, to calculate a second friction related value based on the first slip related value, the estimated first tire stiffness related value and the a second stiffness related value, and to feed back the calculated second friction related value as a basis of an estimation of a third tire stiffness value.

DETAILED DESCRIPTION OF PREFERRED EMBODIMENTS

As mentioned above, any curve displaying normalized traction forces versus slip is referred to as "slip curve". A friction potential is generally defined as the maximum of a slip curve and depends on a variety of variables, such as road surface and tire characteristics and operating condition (pressure, temperature, vertical load, wear, etc.).

Figure 1:
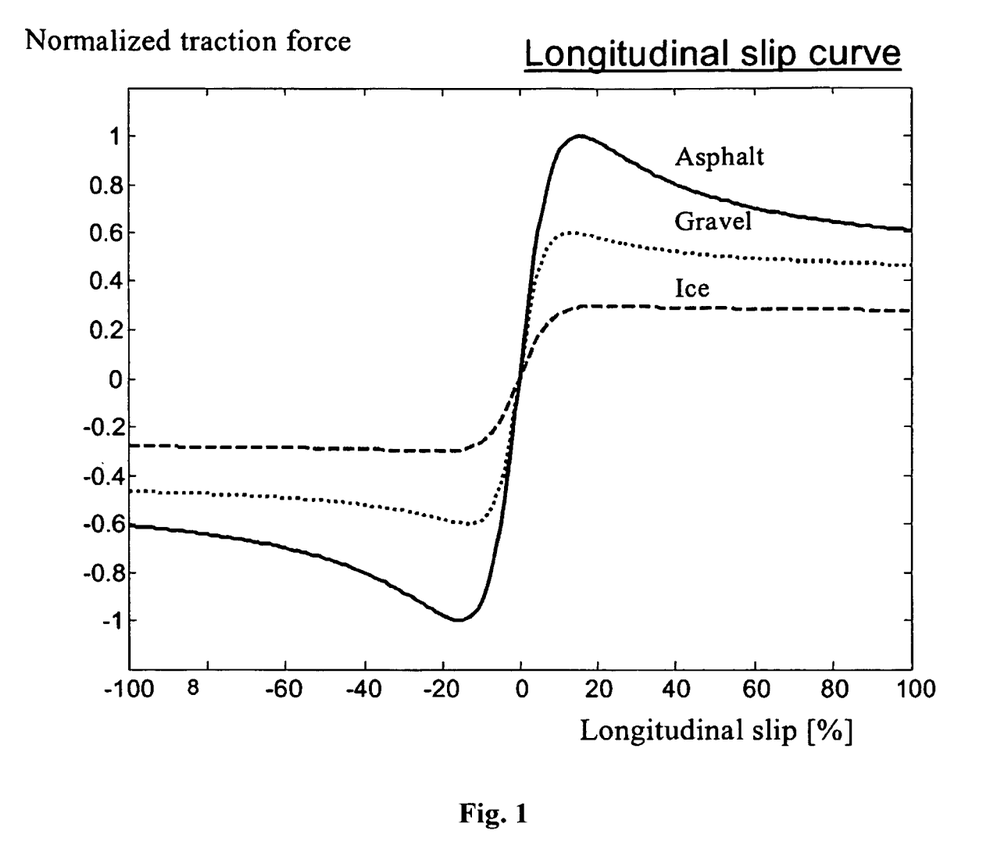
FIG. 1 is a graph representing typical (normalized) traction forces as a function of slip for a variety of road surfaces with different friction potential.

FIG. 1 illustrates the dependence of friction potential on road surface. The relationship between normalized traction force and longitudinal slip is exemplified for three road surfaces, namely on ice, gravel and asphalt. As displayed, the friction potential on asphalt is generally higher than on gravel, whereas the friction potential on gravel is higher than on ice. In FIG. 1 as well as in the rest of the present disclosure, all quantities and values (in particular slip) are understood to refer to the longitudinal direction, unless otherwise noted. A slip curve may be divided in multiple regions, including an approximately linear portion around the origin, e.g. from −10% to +10% of slip in FIG. 1.

In the following, the term "slip slope" is understood to refer to the slope of the linear portion of the slip curve. A slip slope is a preferred example of a slip related value and may be used accordingly in the methods described herein.

The first and second friction related values may specifically, but not exclusively be embodied as values of friction used, i.e. the ordinate of a point on the slip curve, as mentioned above.

Based on a slip slope and a friction used, a multitude of methods are known to the skilled person for estimating at least a lower boundary of the current friction potential. The methods described in the following provide ways to more accurately and more reliably determine the friction potential.

Figure 2:
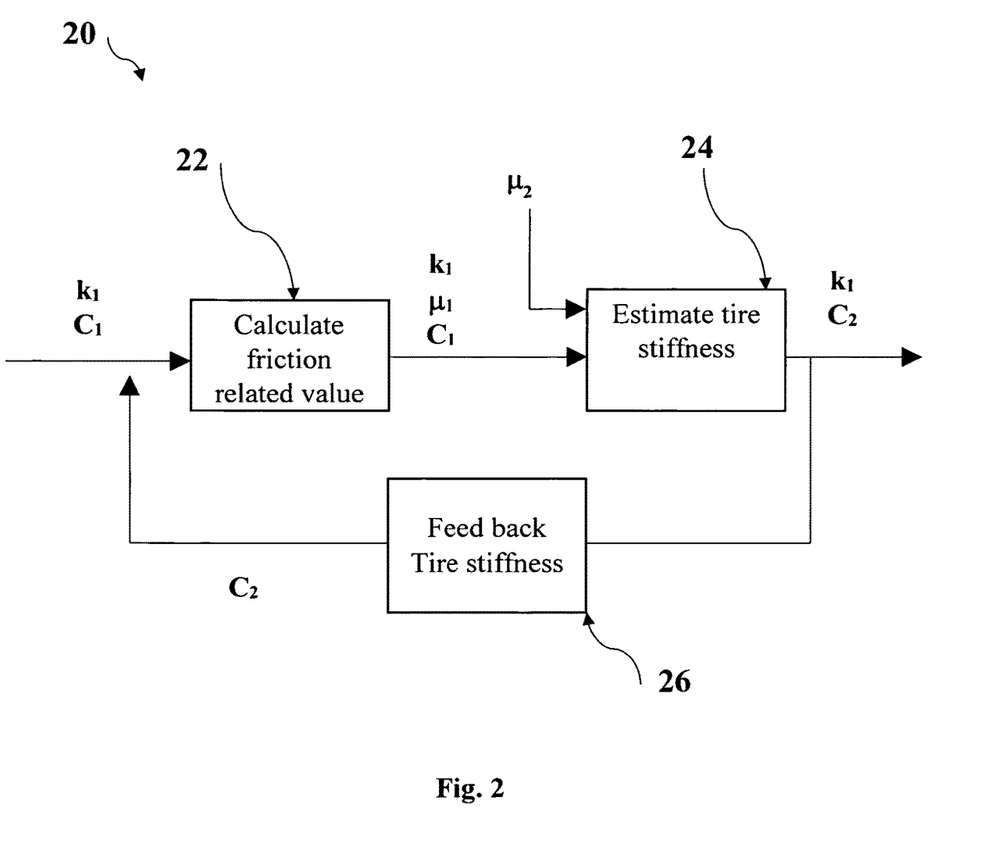
FIG. 2 is a flow chart of a method according to embodiments.

FIG. 2 depicts a flow chart of an embodiment of a method of determining a friction potential of a wheel of a vehicle according to the present invention.

The method 20 uses a first slip related value, namely a first slip slope $k_1$, and a first tire stiffness related value $C_1$, as inputs. The first slip slope $k_1$, is obtained from at least one vehicle sensor for providing slip related values.

In a first step 22, the method 20 calculates a first friction related value $\mu_1$ based on the first slip slope $k_1$ and the first tire stiffness related value $C_1$.

$$\mu_1 = f(C_1, k_1)$$

where the function $f$ may be a tailored tire model known to the skilled person, such as for example a Brush tire model.

Further, a second tire stiffness $C_2$ is estimated (step 24) based on the first slip slope $k_1$ and a second friction related value $\mu_2$.

$$C_2 = g(\mu_1, \mu_2)$$

The second tire stiffness $C_2$, is fed back, i.e. it is used as an input to a calculation at a later point in time. The fed-back tire stiffness may be intended as a basis for the calculation of a third friction related value $\mu_3$.

As illustrated, the steps 22, 24 and 26 are carried out in closed loop. At each iteration, first and second values are substituted by second and third value, etc. The iteration permits to obtain a time series of slip slope values from the at least one vehicle sensor and to refine the determination of the stiffness estimate by an adaptive model. At each iteration, the most recent slip slope value and the fed-back tire stiffness estimate are used to calculate a more accurate friction value. Thus, using the adaptive model disclosed herein, the effect of the current actual tire stiffness and changes thereof can be accounted for before and during determination of the friction potential.

In some embodiments, in addition or as an alternative to the estimated tire stiffness, a second friction related value is fed back.

Figure 3:
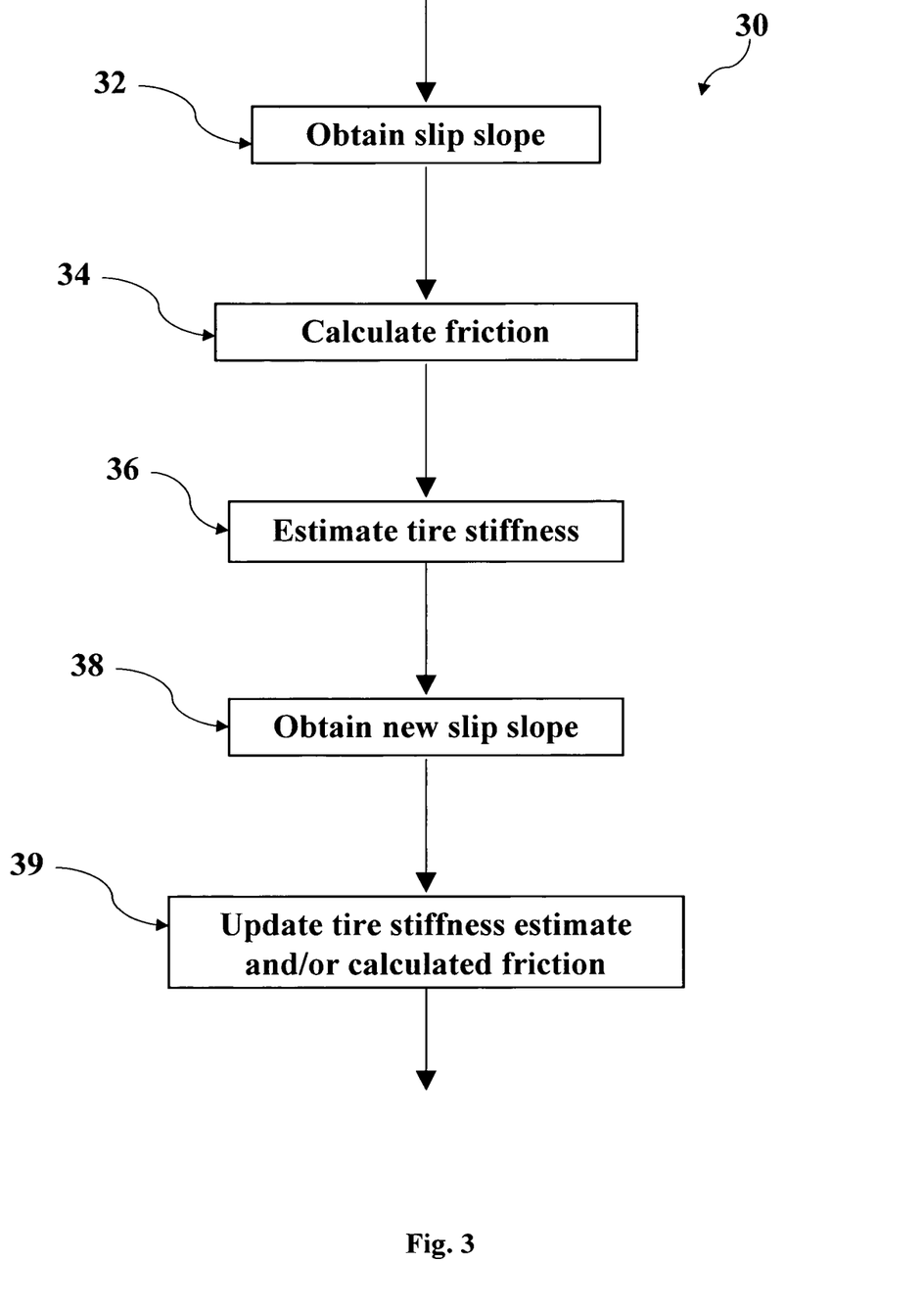
FIG. 3 is a flow chart of a method according to embodiments.

FIG. 3 is a flow chart of a further embodiment of a method. The method 30 commences with obtaining (step 32) a first slip slope, which is a slip related value. Based on this slip slope, a friction value is calculated (step 34). A tire stiffness is estimated (step 36), wherein the estimation uses the obtained slip slope and a second friction related value as basis.

Once a new (second) slip slope value is obtained (step 38), the method 30 proceeds with updating (step 39) the calculated friction and/or tire stiffness estimate based at least on the new slip slope. In other words, the previously estimated tire stiffness is used as an input to this calculation in a feedback manner.

Figure 4:
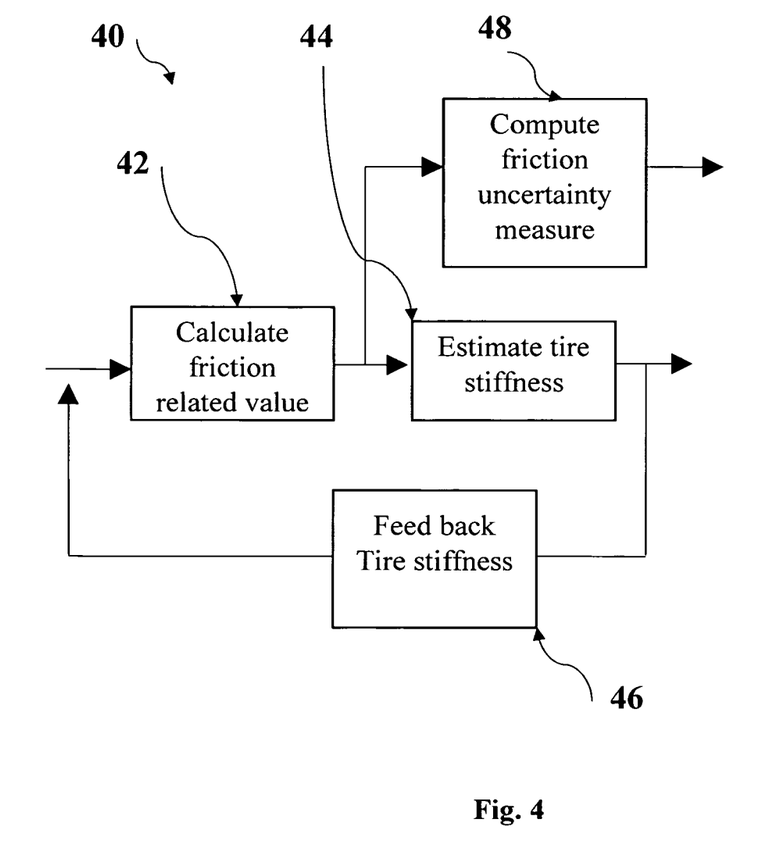
FIG. 4 is a flow chart of a method according to embodiments.

FIG. 4 is a flow chart of a method according to an embodiment. The depicted embodiment is in general similar to the embodiment of FIG. 2. In addition, the embodiment of FIG. 4 comprises computing a friction uncertainty measure, indicative of the uncertainty of the friction related value.

Based on the estimated tire stiffness C and on a covariance $\sigma_k^2$ of the slip related value, a friction uncertainty measure $\sigma_\mu$ is computed (step 48)

$$\sigma_\mu = h(C, \sigma_k^2, \sigma_{corr}^2, T).$$

If the slip related value is a slip slope, then the covariance of the slip related value may be provided by a Kalman filter used to estimate the slip slope. The uncertainty measure and its temporal evolution permits to evaluate when the adaptive tire model has reached a certain desired level of reliability. Furthermore, the estimated friction potential $\sigma_\mu$ cannot be relied upon before the tire model has been adequately adapted, meaning the feedback is iterated a sufficient number of times. Therefore $\sigma_{corr}^2$ has a high value before any model adaptation in the feedback loop has taken place. When the model has been adapted, $\sigma_{corr}^2$ has either a low value or a zero value depending on the quality and number of feedback iterations. Only once a certain level or reliability had been reached, the determined friction may be handed over to other system(s), e.g. an ABS system, for further processing. Further, the uncertainty may also be a function of a temperature T, such as at least one of the ambient temperature, the tire cavity temperature and the inner liner temperature. For instance the tire stiffness may be highly temperature-dependent around the freezing point of water. This temperature dependency may vary for different types of tires (summer, winter, all-season, ultra-high performance, etc.).

Figure 5:
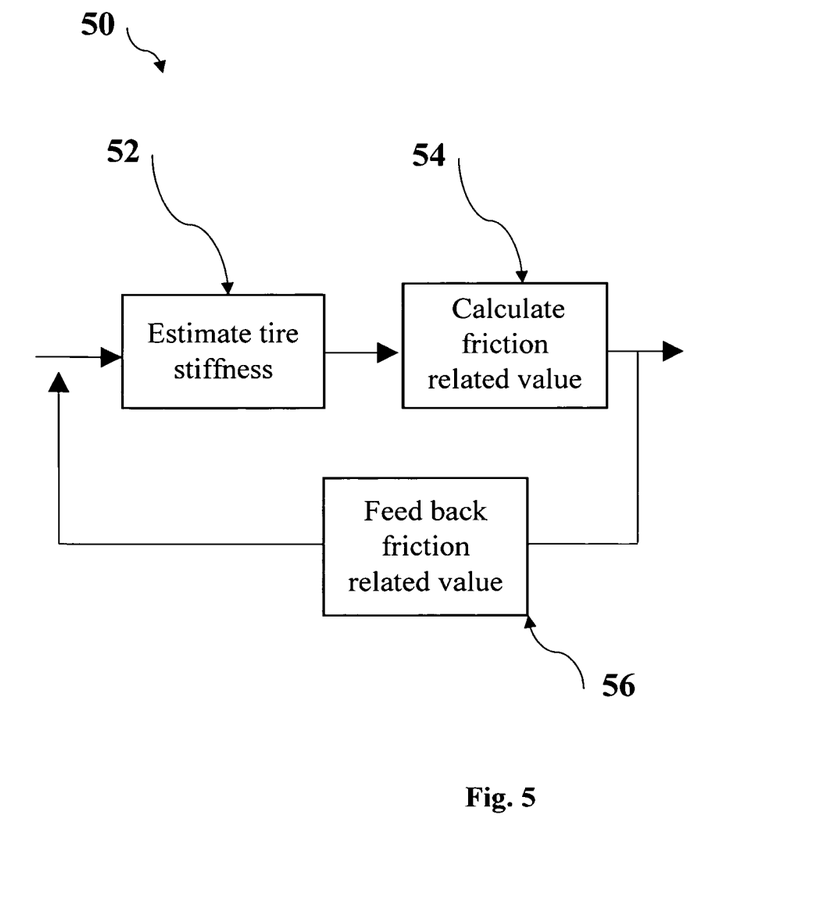
FIG. 5 is a flow chart of a method according to embodiments.

FIG. 5 is a flow chart of a method according to an embodiment. The depicted embodiment is in general similar to the embodiment of FIG. 2. However, in comparison with the embodiment of FIG. 2, the order of estimating a tire stiffness and calculating a friction related value is reversed. First, the tire stiffness is estimated (step 52) based on an obtained slip related value and a friction related value. Second, a second friction related value is calculated (step 54) based on the estimated tire stiffness and the obtained slip related value. The feeding back (step 56) of the second friction related value is analogous to the case of FIG. 2. The fed-back second tire stiffness related value may be intended as a basis of an estimation of a third tire stiffness.

Figure 6:
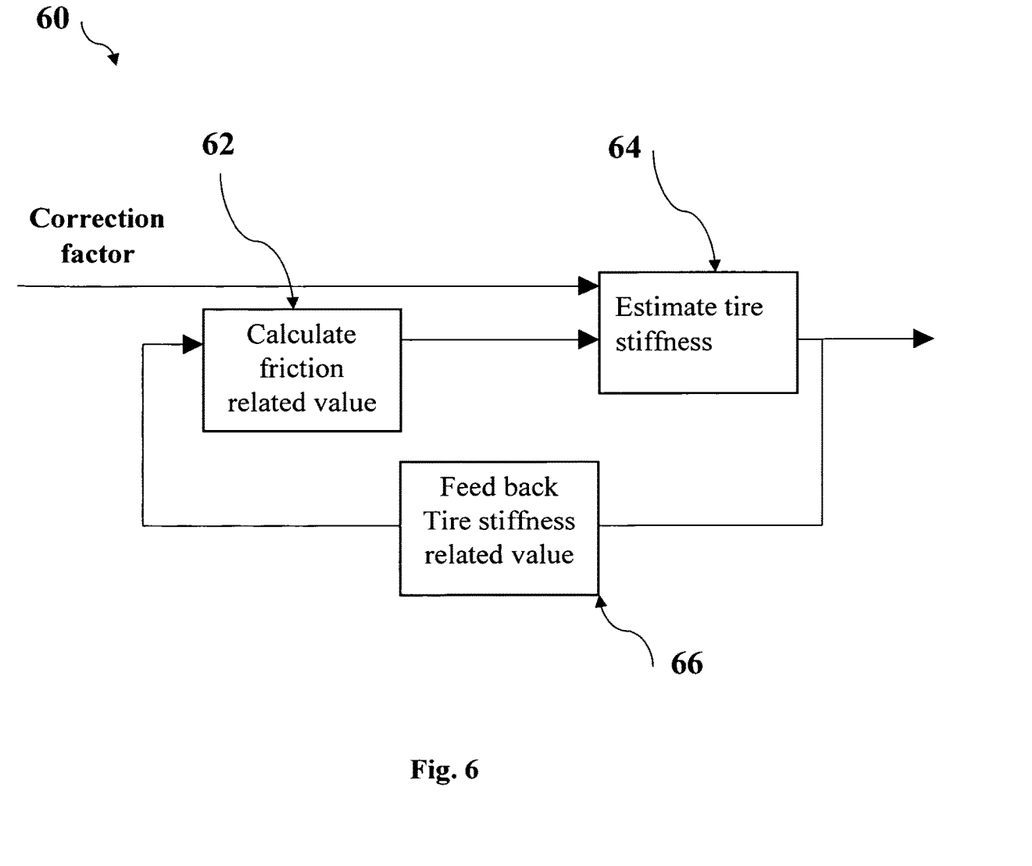
FIG. 6 is a flow chart of a method according to embodiments.

FIG. 6 depicts a flow chart of an embodiment of a method according to the invention. The depicted embodiment is in general similar to the embodiment of FIG. 2.

In addition, the embodiment of FIG. 6 comprises taking into account a stiffness-correction factor $\Delta C$ in the estimation of the first tire stiffness $C_1$ (step 64).

The stiffness-correction factor $\Delta C$ is estimated in feed-forward. In particular, the stiffness-correction factor may serve the purpose of taking into account ambient or tire conditions, such as a pressure of the tire, a temperature of the tire, an ambient temperature, an axle height, a suspension pressure, or a suspension height.

For illustration purposes, it is recalled that tire stiffness is—inter alia—a function of e.g. the ambient temperature. The tire stiffness increases as the ambient temperature decreases and approaches the freezing point of water. In view of this fact, a stiffness-correction factor may be added during tire stiffness estimation, dependent on a temperature difference, e.g. relative to a reference temperature. Similarly, as additional examples, the tire stiffness is also a function of pressure and vertical load that will also change the longitudinal stiffness.

The estimated stiffness-correction factor may be a multiplicative or an additive factor.

Figure 7:
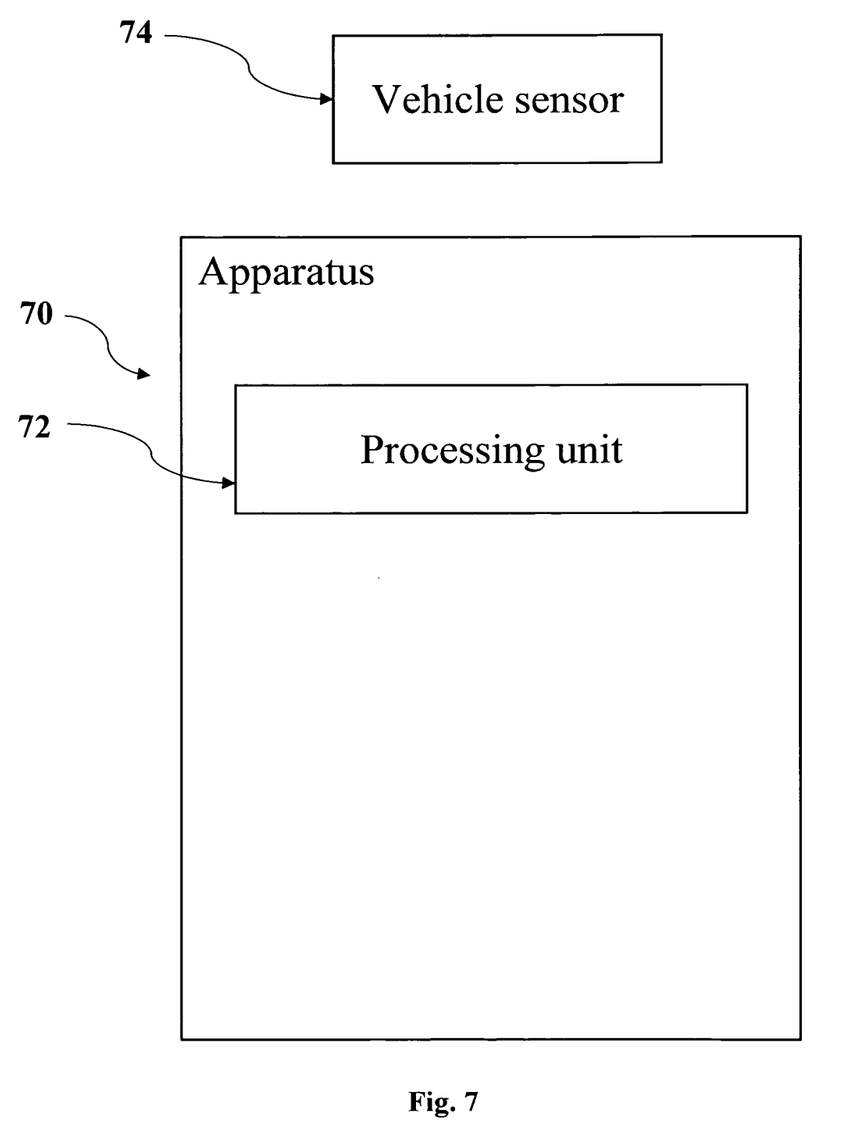
FIG. 7 is a box chart of an apparatus according to embodiments.

FIG. 7 depicts a box chart of an apparatus according to some embodiments. The apparatus 70 comprises a processing unit 72. The processing unit 72 is configured to calculate a first friction related value based on a first slip related value and a first tire stiffness related value, to estimate a second tire stiffness related value based on the first slip related value, the calculated first friction related value and a second friction related value, and to feed back the estimated second tire stiffness related value as a basis of a calculation of a third friction related value.

The slip related values are provided by a vehicle sensor 74. In some embodiments, the apparatus 70 may comprise the vehicle sensor 74.

In some embodiments, the apparatus may further comprise a connectivity interface (not shown), which is adapted for communication with entities external to the vehicle, such as vehicle-to-vehicle or vehicle-to-infrastructure communication.

What is claimed is:

1. A method of determining at least one of a friction potential and a tire stiffness of a wheel of a vehicle, the method comprising:
   calculating, using at least one vehicle sensor that provides slip related values (k1, k2), a first friction related value ($p_a$) based on a first slip related value ($k_1$) and a first tire stiffness related value ($C_1$),
   estimating, without requiring a tire identification, a second tire stiffness related value ($C_2$) based on the first slip related value ($k_1$), the calculated first friction related value ($\mu_1$) and a second friction related value ($\mu_2$),
   feeding back the estimated second tire stiffness related value ($C_2$) as a basis of a calculation of a third friction related value ($\mu_3$),
   computing a friction uncertainty measure, indicative of an uncertainty of the third friction related value, based on: the estimated second tire stiffness related value and a covariance of the slip related values ($k_1$, $k_2$),
   determining whether the friction uncertainty measure is smaller than a reliability threshold, and
   responsive to a determination that the friction uncertainty measure is smaller than the reliability threshold, communicating the third friction related value to a vehicle control system and using the third friction related value in the vehicle control system.

2. The method according to claim 1, further comprising:
   estimating, in a feedforward loop/open loop, a stiffness-correction factor ($\Delta C$), the second tire stiffness related value ($C_2$) is also based on the stiffness-correction factor ($\Delta C$).

3. The method according to claim 2 the estimating of the stiffness-correction factor is based on at least one of:
   a pressure of the tire,
   a temperature of the tire,
   an ambient temperature,
   an axle height,
   a suspension pressure, and
   a suspension height.

4. The method according to claim 3, the estimating is also based on at least one of:
   an estimated friction potential from an ABS braking,
   an estimated friction potential from a TCS event,
   an estimated friction potential received from vehicle connectivity,
   a normalized traction force on the wheel,
   a friction related value,
   a torque applied on the wheel,
   a longitudinal acceleration,
   a lateral acceleration,
   a brake pressure,
   a yaw rate,
   a wheel speed,
   a vehicle speed,
   a steering wheel angle,
   a wheel angle,
   a tire pressure,
   a tire temperature,
   an ambient temperature,
   an axle height,
   a suspension pressure,
   a suspension height, and
   a control flag register.

5. A non-transitory computer program product including program code configured to, when executed in a computing device, carry out a method of determining at least one of a friction potential and a tire stiffness of a wheel of a vehicle, the method comprising:
   calculating, using at least one vehicle sensor that provides slip related values (k1, k2), a first friction related value ($\mu_1$) based on a first slip related value ($k_1$) and a first tire stiffness related value ($C_1$),
   estimating, without requiring a tire identification, a second tire stiffness related value ($C_2$) based on the first slip related value ($k_1$), the calculated first friction related value ($\mu_1$) and a second friction related value ($\mu_2$),
   feeding back the estimated second tire stiffness related value ($C_2$) as a basis of a calculation of a third friction related value ($\mu_3$),
   computing a friction uncertainty measure, indicative of an uncertainty of the third friction related value, based on: the estimated second tire stiffness related value and a covariance of the slip related values ($k_1$, $k_2$),
   determining whether the friction uncertainty measure is smaller than a reliability threshold, and
   responsive to a determination that the friction uncertainty measure is smaller than the reliability threshold, communicating the third friction related value to a vehicle control system and using the third friction related value in the vehicle control system.

6. An apparatus to determine at least one of a friction potential and a tire stiffness of a wheel of a vehicle, the apparatus comprising a processing unit, the processing unit configured to perform operations, comprising:
   calculating, using at least one vehicle sensor that provides slip related values (k1, k2), a first friction related value ($\mu_1$) based on a first slip related value ($k_1$) and a first tire stiffness related value ($C_1$),
   estimating, without requiring a tire identification, a second tire stiffness related value ($C_2$) based on the first slip related value ($k_1$), the calculated first friction related value ($\mu_1$) and a second friction related value ($\mu_2$),
   feeding back the estimated second tire stiffness related value ($C_2$) as a basis of a calculation of a third friction related value ($\mu_3$),
   computing a friction uncertainty measure, indicative of an uncertainty of the third friction related value, based on:

the estimated second tire stiffness related value and a covariance of the slip related values ($k_1$, $k_2$), determining whether the friction uncertainty measure is smaller than a reliability threshold, and responsive to a determination that the friction uncertainty measure is smaller than the reliability threshold, communicating the third friction related value to a vehicle control system and using the third friction related value in the vehicle control system.

\* \* \* \* \*